(12) United States Patent
Kumazaki

(10) Patent No.: US 12,179,760 B2
(45) Date of Patent: Dec. 31, 2024

(54) VEHICLE CONTROL DEVICE, STORAGE MEDIUM FOR STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventor: Kenta Kumazaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/074,235

(22) Filed: Dec. 2, 2022

(65) Prior Publication Data

US 2023/0242113 A1     Aug. 3, 2023

(30) Foreign Application Priority Data

Feb. 2, 2022    (JP) .................................. 2022-015079

(51) Int. Cl.
*B60W 30/14*      (2006.01)

(52) U.S. Cl.
CPC .................................. *B60W 30/146* (2013.01)

(58) Field of Classification Search
CPC . B60W 30/146; B60W 30/143; B60W 40/105
See application file for complete search history.

(56) References Cited

U.S. PATENT DOCUMENTS

| | | | |
|---|---|---|---|
| 2012/0253628 A1 | 10/2012 | Maruyama | |
| 2015/0073620 A1 | 3/2015 | Matsumura | |
| 2015/0224992 A1* | 8/2015 | Dornieden | B60W 30/143 701/1 |
| 2016/0214608 A1* | 7/2016 | Packwood-Ace | B60W 30/143 |
| 2017/0282917 A1* | 10/2017 | Pilutti | G01S 19/13 |

FOREIGN PATENT DOCUMENTS

| | | |
|---|---|---|
| JP | 2006-321354 A | 11/2006 |
| JP | 2010-083402 A | 4/2010 |
| JP | 2012-206594 A | 10/2012 |
| JP | 2013-241146 A | 12/2013 |
| JP | 2015-054580 A | 3/2015 |
| JP | 2019-175209 A | 10/2019 |
| JP | 2020-125832 A | 8/2020 |
| JP | 2020-192824 A | 12/2020 |

* cited by examiner

*Primary Examiner* — Peter D Nolan
*Assistant Examiner* — Roy Rhee
(74) *Attorney, Agent, or Firm* — Oliff PLC

(57) ABSTRACT

A vehicle control device has a processor configured to determine a set speed for a vehicle representing a target speed based on a speed limit of a road, and a current correction value corresponding to the speed limit of the road, count a number of changes the set speed for the vehicle has been changed by a driver, and calculate a new correction value for the set speed for the vehicle based on a correction coefficient determined based on the number of changes, and speed difference between the set speed for the vehicle after change and the speed limit of the road, each time the number of changes has been counted, wherein the next set speed for the vehicle is determined based on the speed limit of the road on which the vehicle is traveling and the new correction value corresponding to the speed limit of the road.

6 Claims, 8 Drawing Sheets

VEHICLE CONTROL DEVICE, STORAGE MEDIUM FOR STORING COMPUTER PROGRAM FOR VEHICLE CONTROL, AND METHOD FOR CONTROLLING VEHICLE

FIELD

The present disclosure relates to a vehicle control device, a storage medium storing a computer program for vehicle control, and a method for controlling a vehicle.

BACKGROUND

An autonomous control system mounted in a vehicle creates a navigation route for the vehicle based on the current location of the vehicle, the destination location of the vehicle, and a navigation map. The autonomous control system estimates the current location of the vehicle using the map information and controls the vehicle to travel along the navigation route.

The autonomous control system also controls the speed of the vehicle so that the vehicle travels at the speed set for the vehicle by the driver. The set speed for the vehicle is set by the driver based on the speed limit for the road on which the vehicle is traveling, for example.

It has been proposed, for an autonomous control system, to use the speed set by the driver as feedback which is reflected during driving of the vehicle (see Japanese Unexamined Patent Publication No. 2020-192824, for example).

SUMMARY

Some terrains having multiple straight roads and multiple curved roads (such as metropolitan expressways). The speed limit often differs for straight roads and curved roads.

It is also possible that the speed of the vehicle desired by the driver while driving on a straight road will differ from the speed of the vehicle desired by the driver while driving on a curved road.

With such terrains it is often difficult for the driver to properly set the speed for the vehicle in response to the terrain. However, no autonomous control system has been proposed which allows the set speed for the vehicle to be determined in a manner that reflects the preference of the driver for such terrains.

It is therefore an object of the present disclosure to provide a vehicle control device that can determine a set speed for the vehicle so as to reflect the preference of the driver.

One embodiment of the invention provides a vehicle control device. The vehicle control device has a vehicle speed determining unit that determines a set speed for a vehicle representing a target speed for the vehicle while the vehicle is traveling, based on a speed limit of a road representing an upper allowable limit for traveling on the road on which the vehicle is traveling, and a current correction value corresponding to the speed limit of the road, a counting unit that counts the number of changes the set speed for the vehicle has been changed by a driver, and a correction value calculating unit that calculates a new correction value for the set speed for the vehicle based on a correction coefficient determined based on the number of changes, and speed difference between the set speed for the vehicle after change and the speed limit of the road on which the vehicle is traveling, each time the number of changes has been counted, in which the vehicle speed determining unit determines the next set speed for the vehicle based on the speed limit of the road on which the vehicle is traveling and the new correction value corresponding to the speed limit of the road.

In addition, the correction value calculating unit in the vehicle control device preferably calculates the correction value to be the product of the correction coefficient and speed difference for each time the set speed for the vehicle is changed by driver operation.

In this vehicle control device, relationship between the correction coefficient and number of changes preferably has a first zone in which the correction coefficient increases as the number of changes increases, a second zone in which the correction coefficient increases more than the first zone as the number of changes increases, and a third zone in which the correction coefficient increases less than the second zone as the number of changes increases.

When a new correction value has been determined, the correction value calculating unit in the vehicle control device also preferably corrects the current correction value for the speed limit of the road before and after the speed limit of the road for which the new correction value was calculated, so that difference between the new correction value and the current correction value for the speed limit of the road before and after is at or below a predetermined reference value.

According to another embodiment, a non-transitory storage medium storing a computer program for vehicle control is provided. The computer program for vehicle control causes a processor execute a process and the process includes determining a set speed for a vehicle representing a target speed for the vehicle while the vehicle is traveling, based on the speed limit of a road representing an upper allowable limit for traveling on the road on which the vehicle is traveling, and a current correction value corresponding to the speed limit of the road, counting the number of changes the set speed for the vehicle has been changed by a driver, and calculating a new correction value for the set speed for the vehicle based on a correction coefficient determined based on the number of changes, and speed difference between the set speed for the vehicle after change and the speed limit of the road on which the vehicle is traveling, each time the number of changes has been counted, in which the next set speed for the vehicle is determined based on the speed limit of the road on which the vehicle is traveling and the new correction value corresponding to the speed limit of the road.

Yet another embodiment of the invention provides a method for controlling a vehicle carried out by a vehicle control device. The method includes determining a set speed for a vehicle representing a target speed for the vehicle while the vehicle is traveling, based on the speed limit of a road representing an upper allowable limit for traveling on the road on which the vehicle is traveling, and a current correction value corresponding to the speed limit of the road, counting the number of changes the set speed for the vehicle has been changed by a driver, and calculating a new correction value for the set speed for the vehicle based on a correction coefficient determined based on the number of changes, and speed difference between the set speed for the vehicle after change and the speed limit of the road on which the vehicle is traveling, each time the number of changes has been counted, in which the next set speed for the vehicle is determined based on the speed limit of the road on which the vehicle is traveling and the new correction value corresponding to the speed limit of the road.

The vehicle control device of the invention can determine a set speed for the vehicle so as to reflect the preference of the driver.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1A:
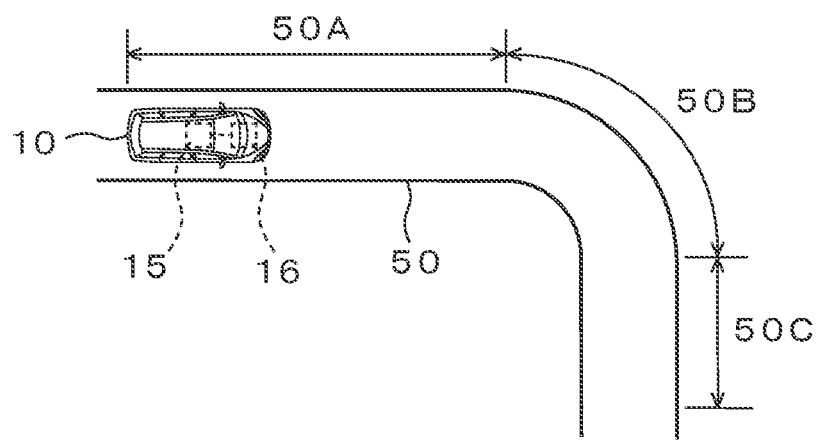
FIG. 1A is a diagram illustrating operation of the drive planning device of the embodiment in overview, showing the state of a vehicle traveling on a road that includes a curve.
Figure 1B:
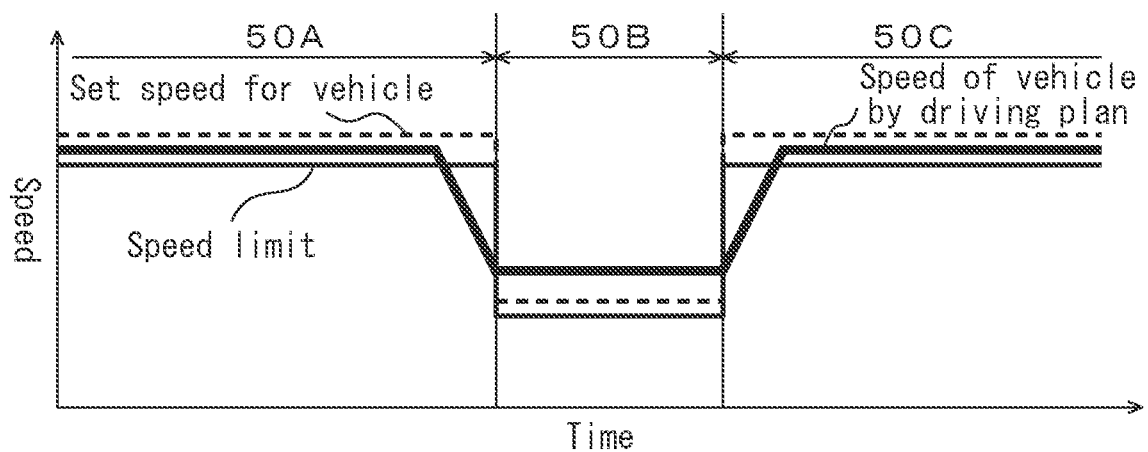
FIG. 1B is a diagram illustrating operation of the drive planning device of the embodiment in overview, showing an example of the relationship between speed and time.
Figure 2A:
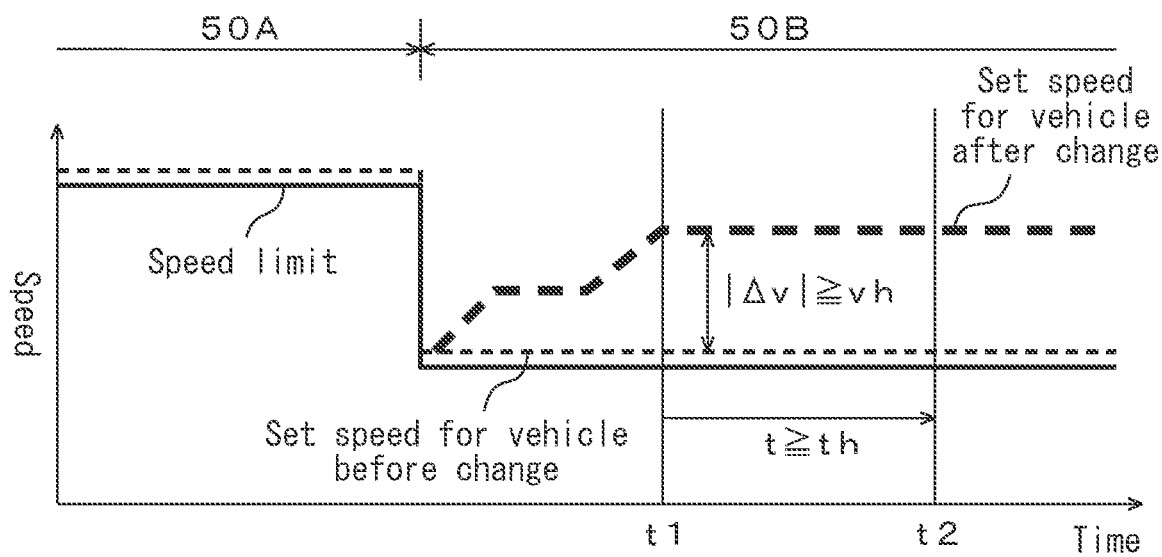
FIG. 2A is a diagram illustrating operation of the drive planning device of the embodiment in overview, showing correction value calculation processing when the vehicle has accelerated.
Figure 2B:
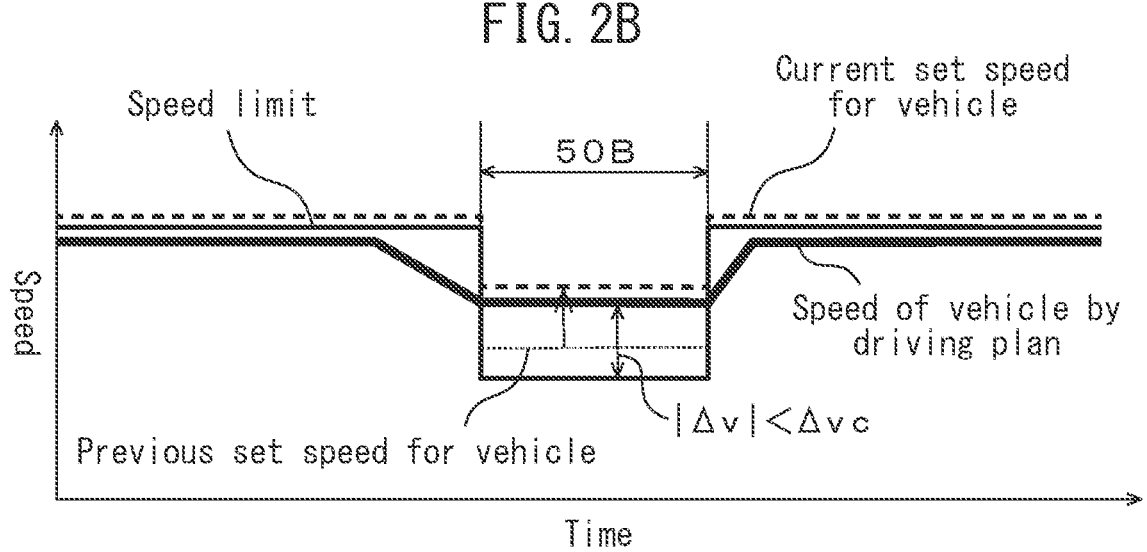
FIG. 2B is a diagram illustrating operation of the drive planning device of the embodiment in overview, showing a new set speed for the vehicle.

FIG. 1A, FIG. 1B, FIG. 2A and FIG. 2B are diagrams showing operation of a drive planning device 15 according to an embodiment in overview. FIG. 1A is a diagram showing the state of a vehicle 10 traveling on a road 50 that includes a curve. FIG. 1B is a diagram showing an example of the relationship between speed and time. FIG. 2A is a diagram showing correction value calculation processing when the vehicle 10 has accelerated. FIG. 2B is a diagram showing a new target curve speed. The vehicle 10 may be an autonomous vehicle.

Operation for vehicle control processing by the drive planning device 15 as disclosed herein will now be described in overview with reference to FIG. 1A, FIG. 1B, FIG. 2A and FIG. 2B.

As shown in FIG. 1A, the vehicle 10 is traveling on the road 50. The road 50 has a straight road zone 50A, a curved road zone 50B and a straight road zone 50C in that order in the traveling direction of the vehicle 10. The vehicle 10 is currently traveling in zone 50A. The speed limit in the curved zone 50B is lower than in the straight road zone 50A and zone 50C.

The vehicle 10 has a drive planning device 15 and a vehicle control device 16. The drive planning device 15 generates a driving plan representing a scheduled traveling trajectory for the vehicle 10 until a predetermined time ahead. The driving plan is represented as a combination of the target location of the vehicle 10 and the target vehicle speed at the target location, at each time from the current time until the predetermined time.

As shown in FIG. 1B, when the vehicle 10 first travels on a road with speed limits, such as zone 50A, zone 50B and zone 50C, the drive planning device 15 determines a set speed for the vehicle for each of zone 50A, zone 50B and zone 50C based on the speed limit of the road and the current correction value corresponding to the speed limit of the road. The set speed for the vehicle represents the target speed for when the vehicle 10 is traveling. The set speed for the vehicle is determined by the drive planning device 15 before the driving plan is created. The driver is able to change the set speed for the vehicle while the vehicle 10 is traveling.

Since the initial value for the correction value corresponding to the speed limit of the road is zero, the set speed for the vehicle for the zone 50A, zone 50B and zone 50C matches the speed limits for the zone 50A, zone 50B and zone 50C.

As shown in FIG. 1B, the drive planning device 15 produces a driving plan for the vehicle 10 to travel at a set speed for the vehicle for zone 50A, zone 50B and zone 50C. Since the set speed for the vehicle in zone 50B is slower than zone 50A, the vehicle 10 decelerates before zone 50B of the curved road, and after passing through zone 50B it accelerates in zone 50C.

As shown in FIG. 2A, the driver may sometimes desire to increase the speed of the vehicle 10 in response to deceleration of the vehicle 10 in zone 50B. The driver therefore changes the set speed for the vehicle so as to accelerate the vehicle 10.

The drive planning device 15 determines that the set speed for the vehicle has been changed by the driver if a state in which the speed difference before and after changing the set speed for the vehicle is at least a reference speed difference vh, continues for at least a predetermined reference time th.

The drive planning device 15 counts the number of changes the set speed for the vehicle has been changed by the driver, for each speed limit of the road.

The drive planning device 15 also calculates a new correction value for the set speed for the vehicle, based on the correction coefficient determined based on the number of changes, and the speed difference between the set speed for the vehicle after change and the speed limit for the road 50 on which the vehicle 10 is traveling, each time the number of changes has been counted.

As shown in FIG. 2B, when the vehicle 10 newly travels in zone 50B, the drive planning device 15 determines a set speed for the vehicle for zone 50B based on the speed limit of the road and the current correction value corresponding to the speed limit of the road.

As shown in FIG. 2B, the current set speed for the vehicle reflects change in the previous set speed for the vehicle, and it is corrected so as to be greater than the previous set speed for the vehicle. With the current set speed for the vehicle, the speed limit of the road and the set speed for the vehicle are closer than previously.

As explained above, the drive planning device 15 can also determine a set speed for the vehicle 10 so as to reflect the preference of the driver, using a correction value calculated based on the correction coefficient determined based on the number of changes and the speed difference between the set speed for the vehicle and the speed limit for the road on which the vehicle 10 is traveling, each time the number of changes has been counted.

Figure 3:
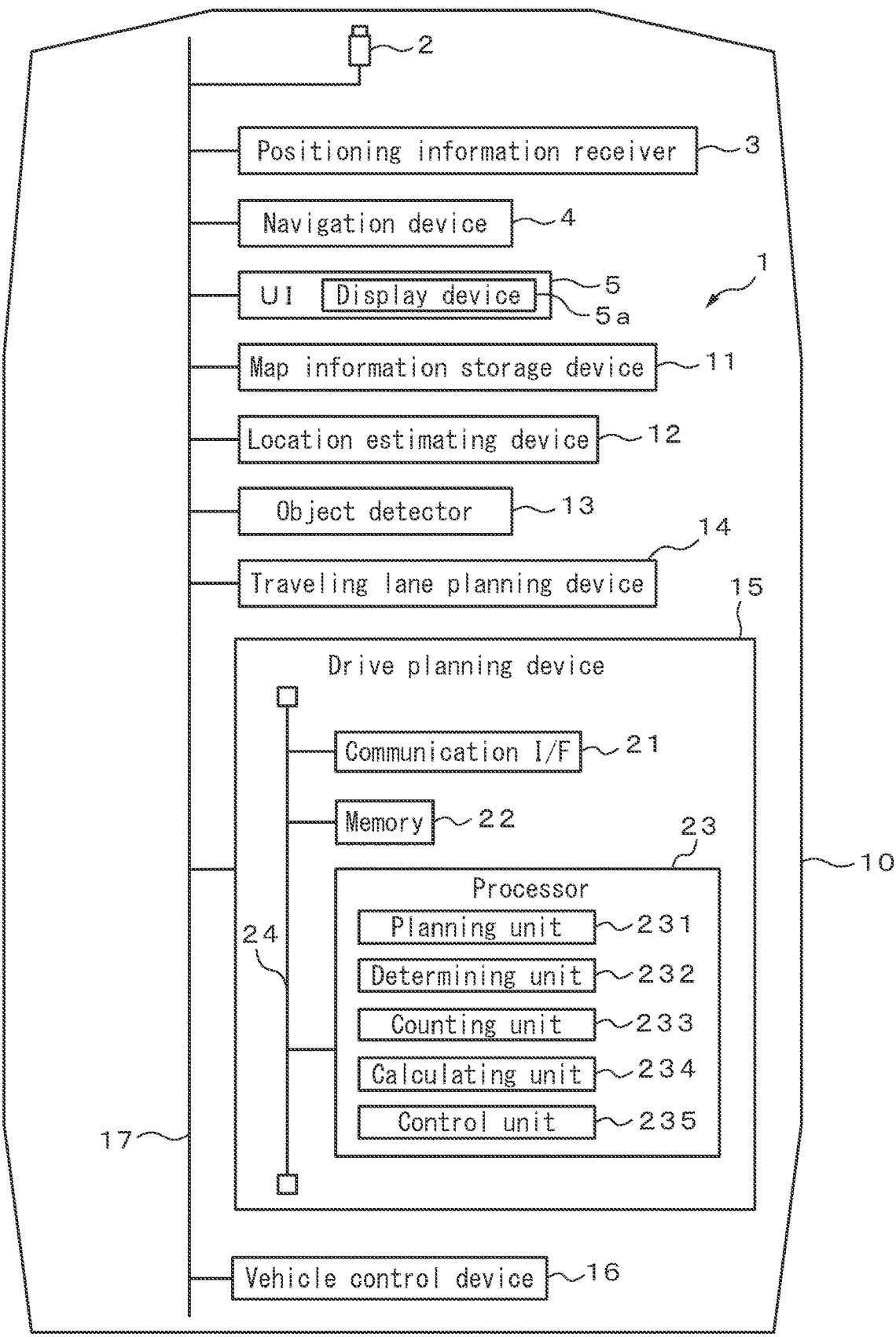
FIG. 3 is a general schematic drawing of a vehicle in which a vehicle control system of the embodiment is mounted.

FIG. 3 is a general schematic drawing of a vehicle 10 in which a vehicle control system 1 of the embodiment is mounted. The vehicle 10 has a camera 2, a positioning information receiver 3, a navigation device 4, a user interface (UI) 5, a map information storage device 11, a location estimating device 12, an object detector 13, a traveling lane planning device 14, the drive planning device 15 and the vehicle control device 16. The vehicle 10 may also have a LiDAR sensor, as a distance sensor (not shown) for measurement of the distance of the vehicle 10 to surrounding objects. The vehicle control system 1 includes at least the drive planning device 15.

The camera 2, positioning information receiver 3, navigation device 4, UI 5, map information storage device 11, location estimating device 12, object detector 13, traveling lane planning device 14, drive planning device 15 and vehicle control device 16 are connected in a communicable manner through an in-vehicle network 17 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 2 outputs the camera image and the camera image photograph time at which the camera image was taken, through the in-vehicle network 17 to the location estimating device 12 and object detector 13, etc. The camera image is also used for processing at the location estimating device 12 to estimate the location of the vehicle 10. At the object detector 13, the camera image is used for processing to detect other objects surrounding the vehicle 10.

The positioning information receiver 3 outputs positioning information that represents the current location of the vehicle 10. The positioning information receiver 3 may be a GNSS receiver, for example. The positioning information receiver 3 outputs positioning information and the positioning information acquisition time at which the positioning information has been acquired, to the navigation device 4 and map information storage device 11, etc., each time positioning information is acquired at a predetermined receiving cycle.

Based on the navigation map information, the destination location of the vehicle 10 input through the UI 5, and positioning information representing the current location of the vehicle 10 input from the positioning information receiver 3, the navigation device 4 creates a navigation route from the current location to the destination location of the vehicle 10. The navigation route includes information relating to the locations of right turns, left turns, merging and branching. When the destination location has been newly set or the current location of the vehicle 10 has exited the navigation route, the navigation device 4 creates a new navigation route for the vehicle 10. Every time a navigation route is created, the navigation device 4 outputs the navigation route to the location estimating device 12 and the traveling lane planning device 14, etc., via the in-vehicle network 17.

The UI 5 is an example of the notification unit. The UI 5, controlled by the navigation device 4, drive planning device 15 and vehicle control device 16, notifies the driver of the vehicle 10 traveling information. Traveling information for the vehicle 10 includes information relating to the current location of the vehicle, road speed limits, control switch requests that request switch in operation of the vehicle 10 from autonomous control to manual control, and current and future routes for the vehicle, such as navigation routes. The UI 5 has a display device 5a such as a liquid crystal display or touch panel, for display of the traveling information. The UI 5 may also have an acoustic output device (not shown) to notify the driver of traveling information. The UI 5 also creates an operation signal in response to operation of the vehicle 10 by the driver. The operation information may be, for example, a destination location, transit points, vehicle speed (set speed for the vehicle) or other vehicle control information. The UI 5 also has a touch panel or operating button, for example, as an input device for inputting operation information from the driver to the vehicle 10. The driver sets the speed of the vehicle based on the speed limit for the road on which the vehicle 10 is traveling, for example. The UI 5 outputs the input operation information to the navigation device 4, the drive planning device 15 and the vehicle control device 16, etc., via the in-vehicle network 17.

The map information storage device 11 stores wide-area map information for a relatively wide area (an area of 10 to 30 km², for example) that includes the current location of the vehicle 10. The map information preferably has high precision map information including three-dimensional information for the road surface, the speed limit for the road, the curvature radius of the road, and information for the types and locations of structures and road features such as road lane marking lines.

The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 3, the map information storage device 11 refers to the stored wide-area map information and outputs map information for a relatively narrow area including the current location represented by the positioning information (for example, an area of 100 m² to 10 km²), through the in-vehicle network 17 to the location estimating device 12, object detector 13, traveling lane planning device 14, drive planning device 15, etc. and vehicle control device 16.

The location estimating device 12 estimates the location of the vehicle 10 at the camera image photograph time, based on the road features surrounding the vehicle 10 represented in the camera image. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16, etc.

The object detector 13 detects other objects around the vehicle 10 and their types (for example, vehicles) based on the camera image, for example. Other objects also include other vehicles traveling around the vehicle 10. The object detector 13 tracks other detected objects and determines the trajectories of the other objects. In addition, the object detector 13 identifies the traveling lanes in which the other objects are traveling, based on the lane marking lines represented in the map information and the locations of the objects. The object detector 13 outputs object detection information which includes information representing the types of other objects that were detected, information indicating their locations, and also information indicating their traveling lanes, to the traveling lane planning device 14 and drive planning device 15, etc.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the drive planning device 15 of the traveling lane plan.

The drive planning device 15 carries out plan processing, determining processing, count processing, calculation processing and control processing. The drive planning device 15 has a communication interface (IF) 21, a memory 22 and a processor 23 for this purpose. The communication interface 21, memory 22 and processor 23 are connected via signal wires 24. The communication interface 21 has an interface circuit to connect the traveling lane planning device 14 with the in-vehicle network 17. The drive planning device 15 is an example of the vehicle control device.

The memory 22 is an example of a memory unit, and it has a volatile semiconductor memory and a non-volatile semiconductor memory, for example. The memory 22 stores an application computer program and various data to be used for information processing carried out by the processor 23.

All or some of the functions of the drive planning device 15 are functional modules driven by a computer program operating on the processor 23, for example. The processor 23 has a planning unit 231, a determining unit 232, a counting unit 233, a calculating unit 234 and a control unit 235. Alternatively, the functional module in the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit.

At a driving plan creation time set with a predetermined cycle, the planning unit 231 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The surrounding environment information includes the locations and speeds of other vehicles traveling around the vehicle 10. The vehicle status information includes the current location of the vehicle 10, and the vehicle speed, acceleration and traveling direction. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other objects (such as vehicles). The drive planning device 15 outputs the driving plan to the vehicle control device 16 for each driving plan generated. Other operation by the drive planning device 15 will be described in detail below.

The vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 17. The vehicle control device 16 also outputs a control signal corresponding to the set accelerator level, to a drive unit (engine or motor) of the engine of the vehicle 10, via the in-vehicle network 17. Alternatively, the vehicle control device 16 may output a control signal corresponding to a set brake level to the brake (not shown) of the vehicle 10, via the in-vehicle network 17.

The map information storage device 11, location estimating device 12, object detector 13, traveling lane planning device 14, drive planning device 15 and vehicle control device 16 are electronic control units (ECU), for example. For FIG. 2, the map information storage device 11, location estimating device 12, object detector 13, traveling lane planning device 14, drive planning device 15 and vehicle control device 16 were explained as separate devices, but all or some of them may be constructed in a single device.

Figure 4:
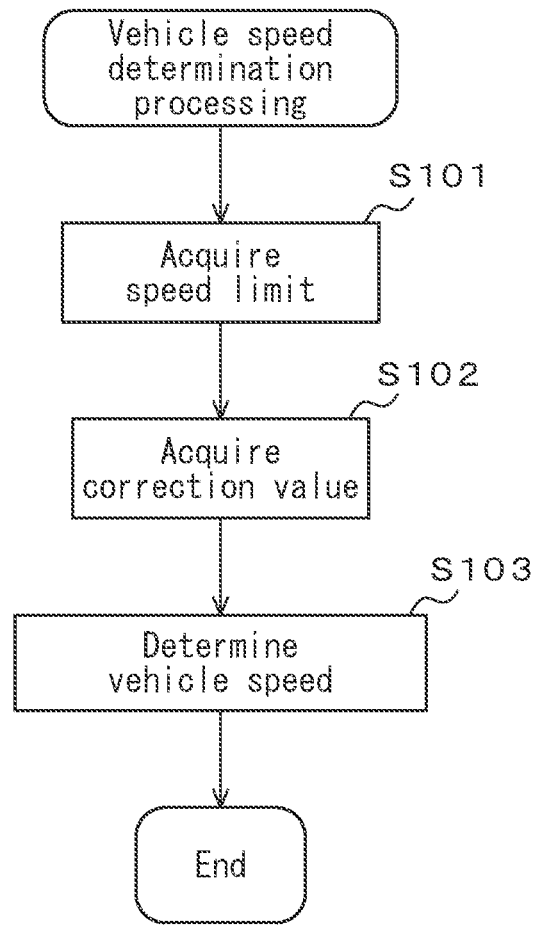
FIG. 4 is an example of an operation flow chart for vehicle speed determination processing by a drive planning device of the embodiment.

FIG. 4 is an example of an operation flow chart for vehicle speed determination processing by the drive planning device 15 of the embodiment. Vehicle speed determination processing by the drive planning device 15 will be described with reference to FIG. 4. The drive planning device 15 carries out vehicle speed determination processing according to the operation flow chart shown in FIG. 4, at a vehicle speed assessment time having a predetermined cycle. The vehicle speed determination processing is preferably carried out before driving plan generation processing. The cycle in which the vehicle speed determination processing is carried out may be the same as for the driving plan generation time.

First, the determining unit 232 refers to the map information and acquires a speed limit for the road in the zone for which the next driving plan is to be generated (step S101). The determining unit 232 is an example of a vehicle speed determining unit. The speed limit is the maximum speed as established by road signs on the road.

The determining unit 232 then refers to the relationship between the correction value and speed limit and acquires a correction value corresponding to the speed limit for the road (step S102). The relationship between the correction value and speed limit is stored in the memory 22, for example. The relationship between the correction value and speed limit is updated each time the correction value corresponding to the speed limit for the road is updated.

Figure 5:
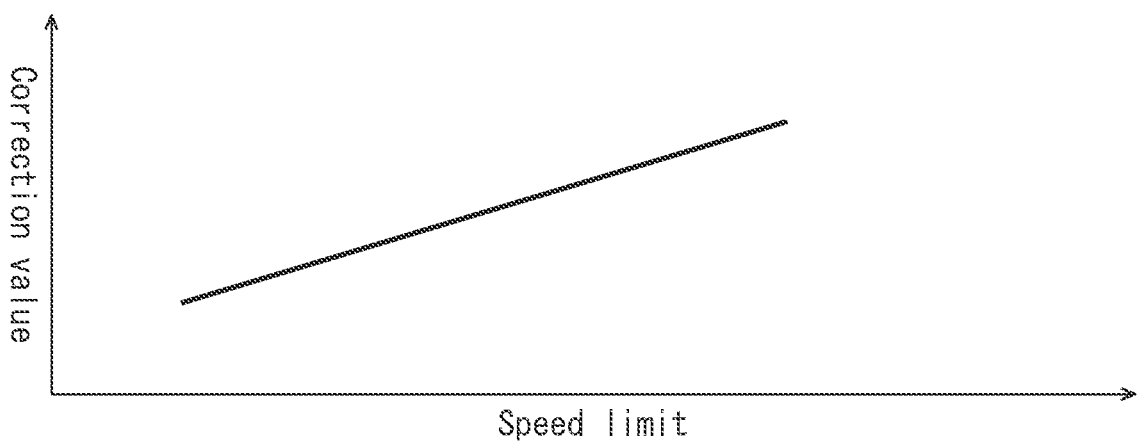
FIG. 5 is a diagram showing an example of the relationship between correction value and speed limit.

FIG. 5 is a diagram showing an example of the relationship between correction value and speed limit. The correction value decreases as the speed limit for the road is reduced, for example. The correction value may be calculated for each speed limit zone of, for example, 10 km/hr to 29 km/hr, 20 km/hr to 39 km/hr, 30 km/hr to 49 km/hr, 50 km/hr to 79 km/hr and 80 km/hr to 100 km/hr. The correction value for the speed limit is the same within a single zone. More specifically, the correction value is updated in response to change in the speed set for the vehicle by the driver. The initial value for the correction value is zero. The correction value may be a positive value, zero or a negative value. An upper limit is preferably set for the absolute value of the correction value. The upper limit of the correction value is determined by design and experimentation, for example. The upper limit of the correction value may also be determined according to the speed limit for the road.

The determining unit 232 then determines a set speed for the vehicle representing the target speed while the vehicle 10 is traveling, based on the speed limit for the road and the current correction value corresponding to the speed limit of the road (step S103), thus completing the series of processing steps. The planning unit 231 also generates a driving plan based on the set speed for the vehicle.

The determining unit 232 calculates the set speed for the vehicle Va to be the sum of the speed limit for the road Vb and the current correction value corresponding to the speed limit of the road M, as represented by the following formula (1).

$$Va = Vb + M \quad (1)$$

Correction value calculation processing in which the correction value is calculated will now be explained with reference to FIG. 6 and FIG. 7.

Figure 6:
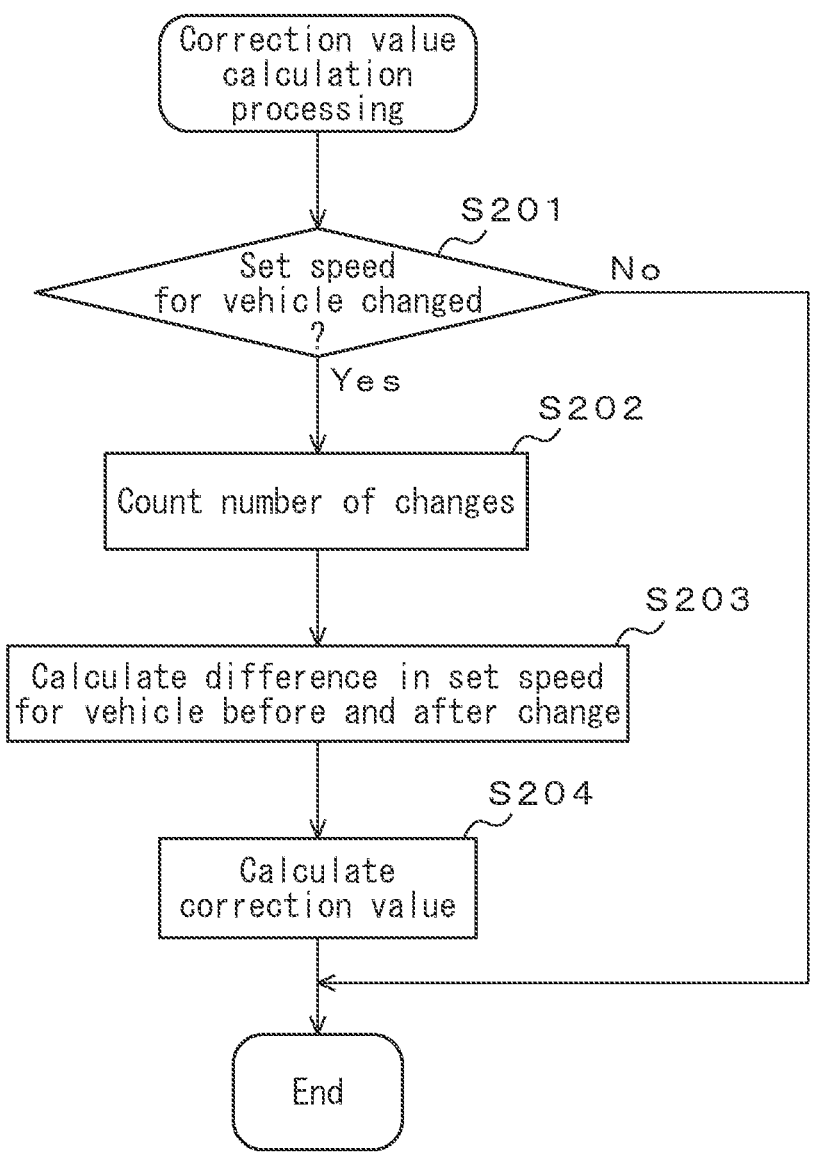
FIG. 6 is an example of an operation flow chart for correction value calculation processing by a drive planning device of the embodiment.

FIG. 6 is an example of an operation flow chart for correction value calculation processing by a drive planning device 15 of the embodiment. The drive planning device 15 carries out correction value calculation processing according to the operation flow chart shown in FIG. 6, each time the value for the set speed for the vehicle is manipulated by the driver.

First, the counting unit 233 determines whether or not the set speed for the vehicle has been changed by the driver (step S201). The driver changes the set speed for the vehicle by inputting the set speed for the vehicle into the drive planning device 15 by operation of the UI 5, for example. When a state in which the absolute value of the speed difference before and after changing the set speed for the vehicle is at least a reference speed difference vh continues for at least a predetermined reference time th, as shown in FIG. 2A, the counting unit 233 determines that the set speed for the vehicle has been changed by the driver. The reference speed difference vh may be 5 km/hr, for example.

When the set speed for the vehicle has been changed (step S201—Yes), the counting unit 233 increases by one the number of changes the set speed for the vehicle has been changed by the driver (step S202). The initial value for the number of changes is zero.

The calculating unit 234 then calculates the difference vd between the set speed for the vehicle after change and the set speed for the vehicle before change (step S203). The calculating unit 234 is an example of the correction value calculating unit. The calculating unit 234 calculates the set speed for the vehicle after change vd by the following formula (2), for example. Here, "v" is the speed of the vehicle. The variable t1 is the time at the initial state in which the absolute value of the difference in set speed for the vehicle is at or above the reference speed difference vh, while t2 is the time after elapse of reference time th from time t1. The variable "ve" is the set speed for the vehicle before change.

$$vd = \int_{t1}^{t2} vdt/th - ve \quad (2)$$

When the set speed for the vehicle after change vd has increased from the set speed for the vehicle before change ye due to an acceleration operation by the driver, the difference in the set speed for the vehicle vd is positive. When the set speed for the vehicle after change vd has decreased from the set speed for the vehicle before change ye due to a deceleration operation by the driver (see FIG. 8A), the difference in the set speed for the vehicle vd is negative.

The calculating unit 234 then calculates a new correction value for the set speed for the vehicle (step S204), based on the correction coefficient determined based on the number of changes and the speed difference vd between the set speed for the vehicle after change and the speed limit for the road on which the vehicle 10 is traveling, each time the number of changes has been counted, and the series of processing steps is complete.

When the set speed for the vehicle has not been changed (step S201—No), the series of processing steps is complete.

In the case of a high frequency of manipulation of the value for the set speed for the vehicle by the driver, it is not necessary to carry out correction value calculation processing for each manipulation of the value for the set speed for the vehicle. For example, new correction value calculation processing may be suspended up until a predetermined time (5 minutes, for example) has elapsed from the time when the previous correction value calculation processing has been carried out.

Processing in which the calculating unit 234 calculates a new correction value will now be explained with reference to FIG. 7. The calculating unit 234 calculates the new correction value to be the product of the correction coefficient for each time the set speed for the vehicle has been changed by driver operation, and the speed difference between the set speed for the vehicle after change and the speed limit for the road on which the vehicle 10 is traveling.

Figure 7:
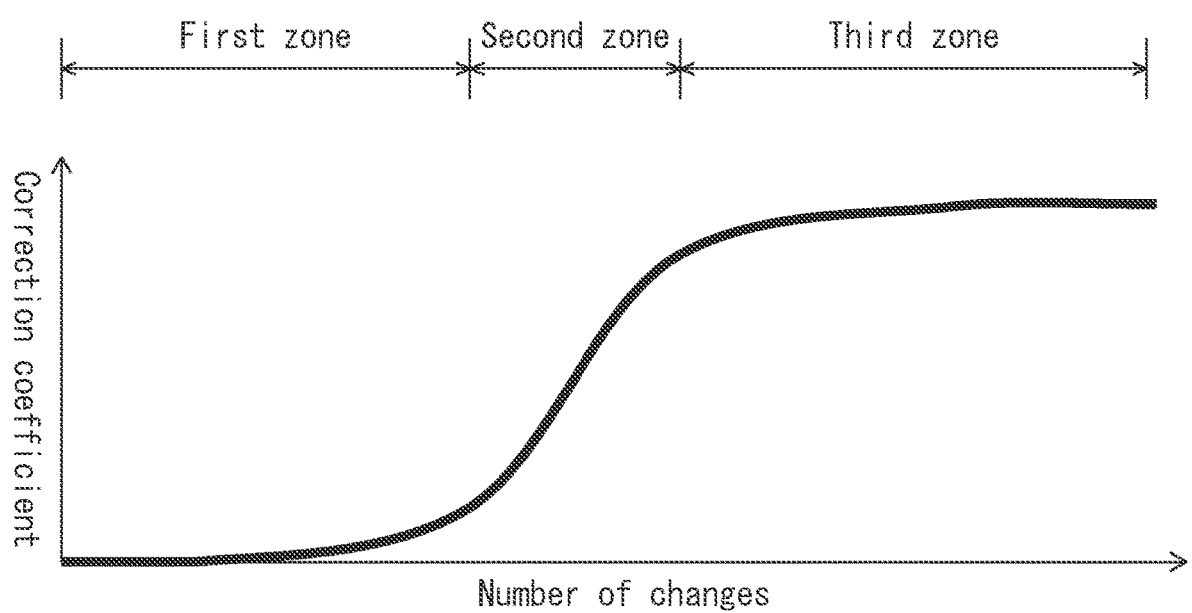
FIG. 7 is a diagram showing an example of the relationship between the correction coefficient and number of changes.

FIG. 7 is a diagram showing an example of the relationship between the correction coefficient and number of changes. The relationship between the correction coefficient and number of changes has a first zone in which the correction coefficient increases as the number of changes increases, a second zone in which the correction coefficient increases more than the first zone as the number of changes increases, and a third zone in which the correction coefficient increases less than the second zone as the number of changes increases. In some cases, changes in the speed set for the vehicle by the driver at the early stage may be coincidental during the course of learning the correction values, and therefore the correction coefficient is low (first zone). When there is a tendency for the driver to change the set speed for the vehicle, the correction coefficient is high (second zone). However, the correction coefficient has an upper limit in practice (third zone). The correction coefficient used may be a sigmoid function, for example. For this embodiment, the correction coefficient is positive.

The product M with the speed difference between the set speed for the vehicle after change and the speed limit for the road on which the vehicle 10 is traveling (correction value) is calculated by the following formula (3). The variable "i" is the number of changes, "$\alpha_i$" is the correction coefficient for the "i"th change, and $vd_i$ is the speed difference for the "i"th change. The initial value $\alpha_0$ of the correction coefficient may also be zero.

$$M = \alpha_i v d_i \qquad (3)$$

When the driver has increased the set speed for the vehicle, the speed difference $vd_i$ is positive and the correction coefficient $\alpha_i$ is zero or positive, and therefore the correction value M is zero or positive. When the driver has decreased the set speed for the vehicle, on the other hand, the speed difference $vd_i$ is negative and the correction coefficient $\alpha_i$ is zero or positive, and therefore the correction value M is zero or negative.

An example of operation of the drive planning device 15 in a vehicle 10 wherein the set speed for the vehicle has been changed (increased) by the driver will now be explained with reference to FIG. 2A and FIG. 2B.

As shown in FIG. 2A, the drive planning device 15 determines the current set speed for the vehicle representing the target speed while the vehicle 10 is traveling, based on the speed limit of the road representing the upper allowable limit for traveling on the road on which the vehicle 10 is traveling, and the current correction value corresponding to the speed limit of the road. The planning unit 231 generates a driving plan based on the set speed for the vehicle.

When the vehicle 10 moves from a zone with a high speed limit (such as zone 50A) to a zone with a low speed limit (such as zone 50B), the drive planning device 15 determines for the set speed for the vehicle to decrease based on the speed limit in the zone.

While the vehicle 10 is traveling in the zone with a low speed limit, the driver who has decided to increase the speed of the vehicle 10 changes the set speed for the vehicle so as to accelerate the vehicle 10.

The drive planning device 15 also calculates a new correction value for the set speed for the vehicle, based on the correction coefficient determined based on the number of changes and the speed difference between the set speed for the vehicle after change and the speed limit for the road on which the vehicle 10 is traveling, each time the number of changes has been counted.

As shown in FIG. 2B, when the vehicle 10 newly travels in a zone with a low speed limit (such as zone 50B), the drive planning device 15 determines a set speed for the vehicle for the zone with a low speed limit based on the speed limit of the road and the current correction value corresponding to the speed limit of the road.

As shown in FIG. 2B, the current set speed for the vehicle is corrected to reflect change in the previous set speed for the vehicle, so as to be greater than the previous set speed for the vehicle.

An example of operation of the drive planning device 15 in a vehicle 10 wherein the set speed for the vehicle has been changed (decreased) by the driver will now be explained with reference to FIG. 8A and FIG. 8B.

Figure 8A:
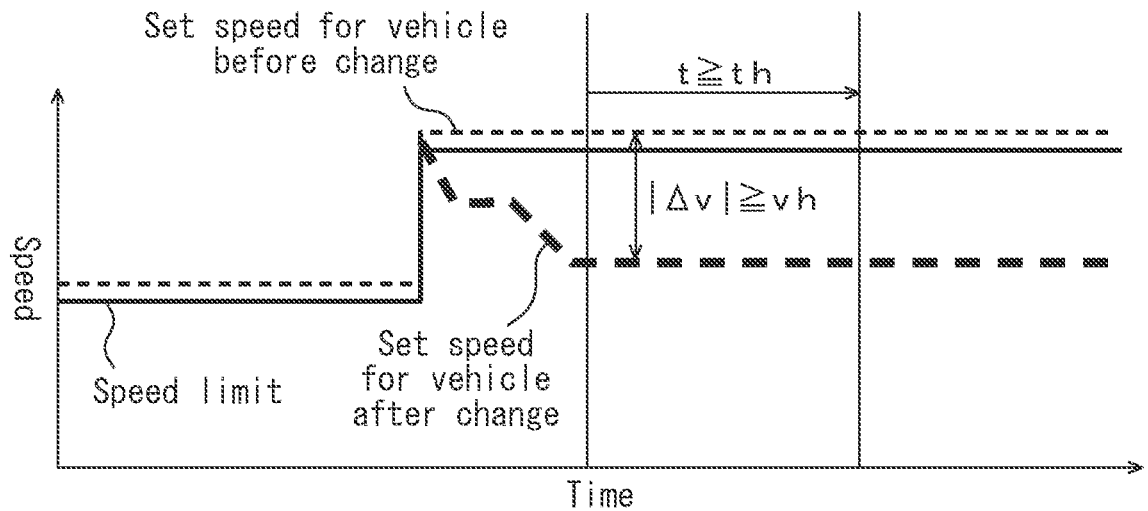
FIG. 8A is a diagram showing correction value calculation processing when a vehicle has decelerated.
Figure 8B:
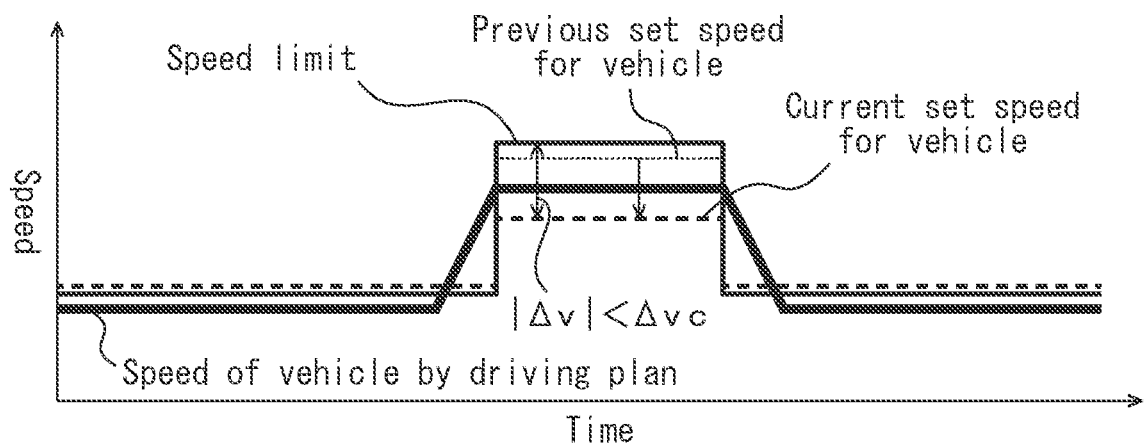
FIG. 8B is a diagram showing a new set speed for the vehicle.

FIG. 8A is a diagram illustrating correction value calculation processing when the vehicle has decelerated, and FIG. 8B is a diagram illustrating a new set speed for the vehicle.

When the vehicle 10 moves from a zone with a low speed limit (such as zone 50B) to a zone with a high speed limit (such as zone 50C), the drive planning device 15 determines the current set speed for the vehicle to increase based on the speed limit in the zone.

While the vehicle 10 is traveling in the zone with a high speed limit (such as zone 50C), the driver who has decided to reduce the speed of the vehicle 10 changes the set speed for the vehicle so as to decelerate the vehicle 10.

The drive planning device 15 also calculates a new correction value for the set speed for the vehicle, based on the correction coefficient determined based on the number of changes and the speed difference between the set speed for the vehicle after change and the speed limit for the road on which the vehicle 10 is traveling, each time the number of changes has been counted.

As shown in FIG. 8B, when the vehicle 10 newly travels in a zone with a high speed limit (such as zone 50C), the drive planning device 15 determines a set speed for the vehicle for the zone with a high speed limit based on the speed limit of the road and the current correction value corresponding to the speed limit of the road.

As shown in FIG. 8B, the current set speed for the vehicle is corrected to reflect change in the previous set speed for the vehicle, so as to be lower than the previous set speed for the vehicle.

The speed limit for the road may significantly diverge from the set speed for the vehicle after the driver has changed the set speed for the vehicle. If the absolute value of the speed difference $\Delta v$ between the speed limit for the road and the current set speed for the vehicle diverges by more than a reference speed difference $\Delta vc$ (such as 15 km/hr), the control unit 235 of the drive planning device 15 notifies the driver of a control switch request, requesting a switch in operation of the vehicle 10 from autonomous control to manual control, via the UI 5 (see FIG. 2B and FIG. 8B). In this case, the driver may change the set speed for the vehicle to approach the speed limit for the road, in order to avoid being notified of the control switch request.

As explained above, the drive planning device can also determine a set speed for the vehicle so as to reflect the preference of the driver, using a correction value calculated based on the correction coefficient determined based on the number of changes and the speed difference between the set speed for the vehicle and the speed limit of the road on which the vehicle is traveling, each time the number of changes has been counted, while also preventing significant divergence between the speed limit for the road and the set speed for the vehicle. Moreover, in this drive planning device the set speed for the vehicle is not set by the driver but rather is set based on the correction value and the speed limit for the road, and this inhibits any significant divergence in the speed difference between the speed limit for the road and the set speed for the vehicle, so that notification of control switch requests to the driver can also be reduced.

A modified example of the drive planning device of this embodiment will now be described.

Figure 9:
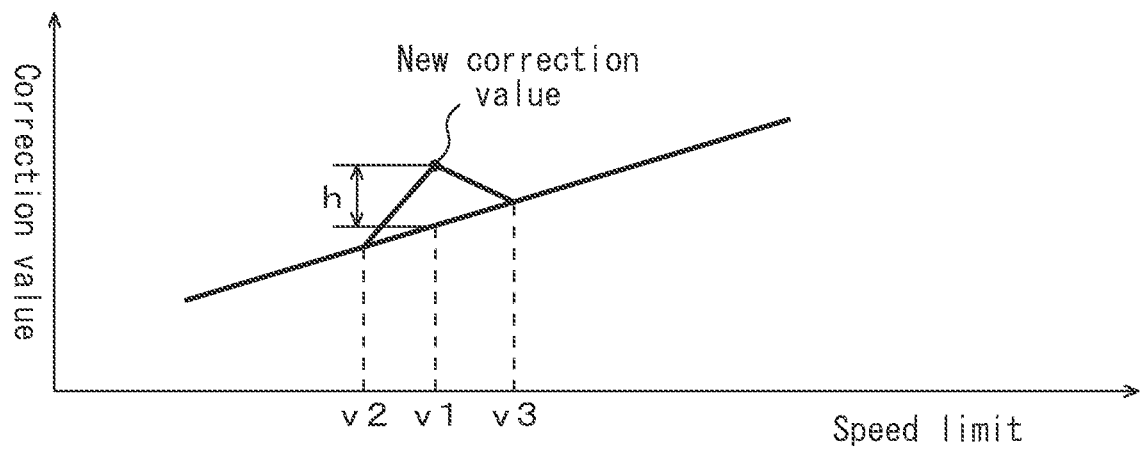
FIG. 9 is a diagram showing an example of the relationship between correction value and speed limit for a modified example.

FIG. 9 is a diagram showing an example of the relationship between correction value and speed limit for a modified example. For this modified example, when the new correction value has been calculated, the calculating unit 234 corrects the current correction value for the speed limit before and after the speed limit of the road for which the new correction value was calculated, so that the difference between the new correction value and the current correction value for the speed limit of the road before and after is at or below a predetermined reference value.

As shown in FIG. 9, the new correction value is calculated with respect to the speed limit v1. The difference h between the new correction value and the current correction value for the speed limit of the road before and after the speed limit v1, is larger than the predetermined reference value. The new correction value is in a discontinuous relationship with the current correction value for the speed limit before and after the speed limit v1.

The calculating unit 234 therefore connects the correction values at locations v2, v3 having predetermined speed limits differing before and after the speed limit v1, with the new correction value for the speed limit v1, by straight lines (or curved lines), and uses the correction values represented by the straight lines (or curved lines) as the current correction values for the speed limit before and after the speed limit v1.

Since each new correction value is thus in a continuous relationship with the correction value for the speed limit for the road before and after the speed limit v1, the set speed for the vehicle is set to a continuous value while the vehicle 10 is traveling on a road with a different speed limit.

In the example shown in FIG. 9, the difference h between the current correction value for the speed limit and the new correction value is positive, but the aforementioned explanation also applies when the difference h is a negative value.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the invention and its equivalents as laid out in the Claims.

For example, when the location where the vehicle is located is in bad weather with rain or snow, the correction coefficient may be zero or smaller, compared to when it is in a favorable weather location with sunny weather, for example. Since the road surface is wetted in bad weather, the vehicle driving conditions will differ from a weather situation with a dry road surface. This can lower the effect that correction in bad weather may have over the correction value in good weather. The correction value may also be determined separately for good weather and for bad weather.

The invention claimed is:

1. A vehicle control device comprising:
a processor configured to
  determine a set speed for a vehicle representing a target speed for the vehicle while the vehicle is traveling, based on a speed limit of a road representing an upper allowable limit for traveling on the road on which the vehicle is traveling, and a current correction value corresponding to the speed limit of the road,
  count a number of changes the set speed for the vehicle has been changed by a driver, and
  calculate a new correction value for the set speed for the vehicle based on a correction coefficient determined based on the number of changes, and speed difference between the set speed for the vehicle after change and the speed limit of the road on which the vehicle is traveling, each time the number of changes has been counted,
wherein the next set speed for the vehicle is determined based on the speed limit of the road on which the vehicle is traveling and the new correction value corresponding to the speed limit of the road.

2. The vehicle control device according to claim 1, wherein the processor is further configured to calculate the correction value as the product of the correction coefficient and the speed difference each time the set speed for the vehicle has been changed by driver operation.

3. The vehicle control device according to claim 1, wherein relationship between the correction coefficient and number of changes has a first zone in which the correction coefficient increases as the number of changes increases, a second zone in which the correction coefficient increases more than the first zone as the number of changes increases, and a third zone in which the correction coefficient increases less than the second zone as the number of changes increases.

4. The vehicle control device according to claim 1, wherein the processor is further configured to correct the current correction value for the speed limit of the road before and after the speed limit of the road for which the new correction value was calculated so that difference between the new correction value and the current correction value for the speed limit of the road is at or below a predetermined reference value, when the new correction value has been calculated.

5. A computer-readable, non-transitory storage medium storing a computer program for vehicle control, which causes a processor execute a process, the process comprising:
determining a set speed for a vehicle representing a target speed for the vehicle while the vehicle is traveling, based on the speed limit of a road representing an upper allowable limit for traveling on the road on which the vehicle is traveling, and a current correction value corresponding to the speed limit of the road;
counting a number of changes the set speed for the vehicle has been changed by a driver; and
calculating a new correction value for the set speed for the vehicle based on a correction coefficient determined based on the number of changes, and speed difference between the set speed for the vehicle after change and the speed limit of the road on which the vehicle is traveling, each time the number of changes has been counted,
wherein the next set speed for the vehicle is determined based on the speed limit of the road on which the vehicle is traveling and the new correction value corresponding to the speed limit of the road.

6. A method for controlling a vehicle carried out by a vehicle control device and the method comprising:
determining a set speed for a vehicle representing a target speed for the vehicle while the vehicle is traveling, based on the speed limit of a road representing an upper allowable limit for traveling on the road on which the vehicle is traveling, and a current correction value corresponding to the speed limit of the road;
counting a number of changes the set speed for the vehicle has been changed by a driver; and
calculating a new correction value for the set speed for the vehicle based on a correction coefficient determined based on the number of changes, and speed difference between the set speed for the vehicle after change and the speed limit of the road on which the vehicle is traveling, each time the number of changes has been counted,
wherein the next set speed for the vehicle is determined based on the speed limit of the road on which the vehicle is traveling and the new correction value corresponding to the speed limit of the road.

* * * * *